Feb. 22, 1966  C. W. CLARK, JR  3,236,060
SELF-SUFFICIENT MOBILE DISPENSING FREEZER
Filed July 9, 1962  2 Sheets-Sheet 1

INVENTOR.
CHARLES WILLIAM CLARK JR.
BY Barnes & Seed
ATTORNEYS

INVENTOR.
CHARLES WILLIAM CLARK JR.
BY Barnes + Seed
ATTORNEYS

United States Patent Office 3,236,060
Patented Feb. 22, 1966

3,236,060
SELF-SUFFICIENT MOBILE DISPENSING FREEZER
Charles William Clark, Jr., Edmonds, Wash., assignor to Sweden Freezer Manufacturing Co., Seattle, Wash., a corporation of Washington
Filed July 9, 1962, Ser. No. 208,361
4 Claims. (Cl. 62—135)

This is a continuation-in-part of application Ser. No. 56,832 filed Sept. 19, 1960, now Patent 3,052,103 issued Sept. 4, 1962.

This invention relates to a self-sufficient mechanical drive, freezing and electrical system for use on an automotive truck, and particularly in conjunction with a dispensing freezer for supplying frozen confections for sale to buyers in the street. In a dispensing freezer of the character to which the present invention pertains, only a given quantity of the confection is frozen at the initiation of a day's run and it is usual to replenish this with unfrozen mix as successive servings of the frozen confection are dispensed. Dashers are provided in the freezer so as to whip air into the mix as the same is being frozen and otherwise give to the confection a proper and uniform consistency. In the past, the compressor and dasher for the dispensing freezer used in a mobile unit have been driven by electric motors in the same manner as for stationary mounted freezers, and hence it has been necessary to install a relatively expensive generator set to provide the required electric power.

In a mobile unit of the type described it is common to have secondary electric loads such as lights, fans, milkshake mixers, etc. and auxiliary refrigeration loads such as a cold storage box for ice cream mix and food products, an air conditioner, or a soda fountain.

Accordingly, the present invention aims to provide a particularly simple and efficient drive arrangement whereby the dasher and compressor of a dispensing freezer can be driven directly from a single engine and controlled by energy derived from said engine.

A further object is to provide in conjunction with such a drive arrangement an electrical system powered by the same engine for controlling the freezer operation and at the same time providing electric energy for secondary electric loads.

Still another object is to provide such a drive arrangement by which the same compressor in the refrigeration system of the dispensing freezer will meet the needs of other refrigeration loads.

With yet additional objects and advantages in view which, with the foregoing, will appear and be understood in the course of the following description and claims, the invention consists in the novel construction and in the adaptation and combination of parts hereinafter described and claimed.

Figure 1:
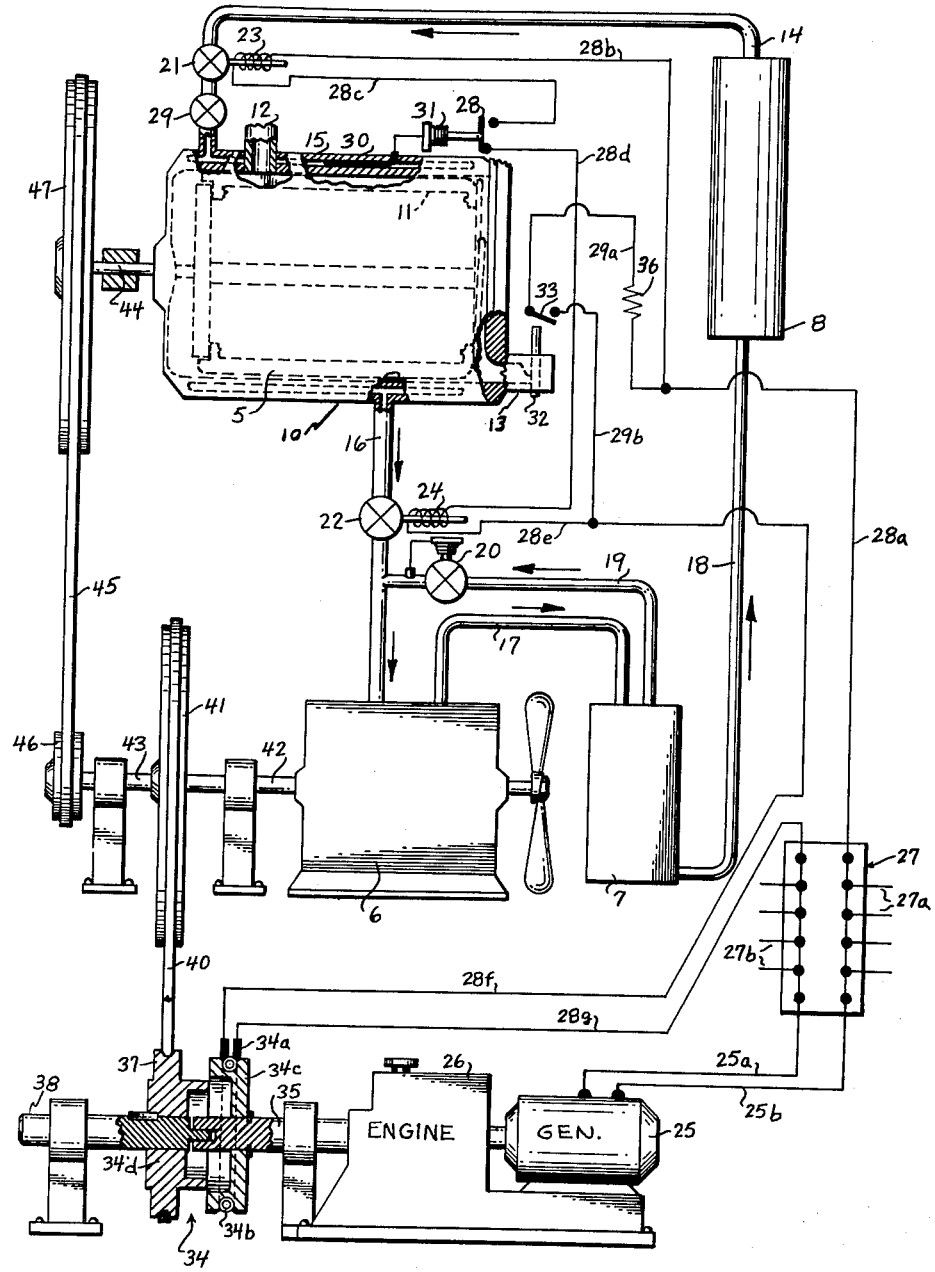
Figure 2:
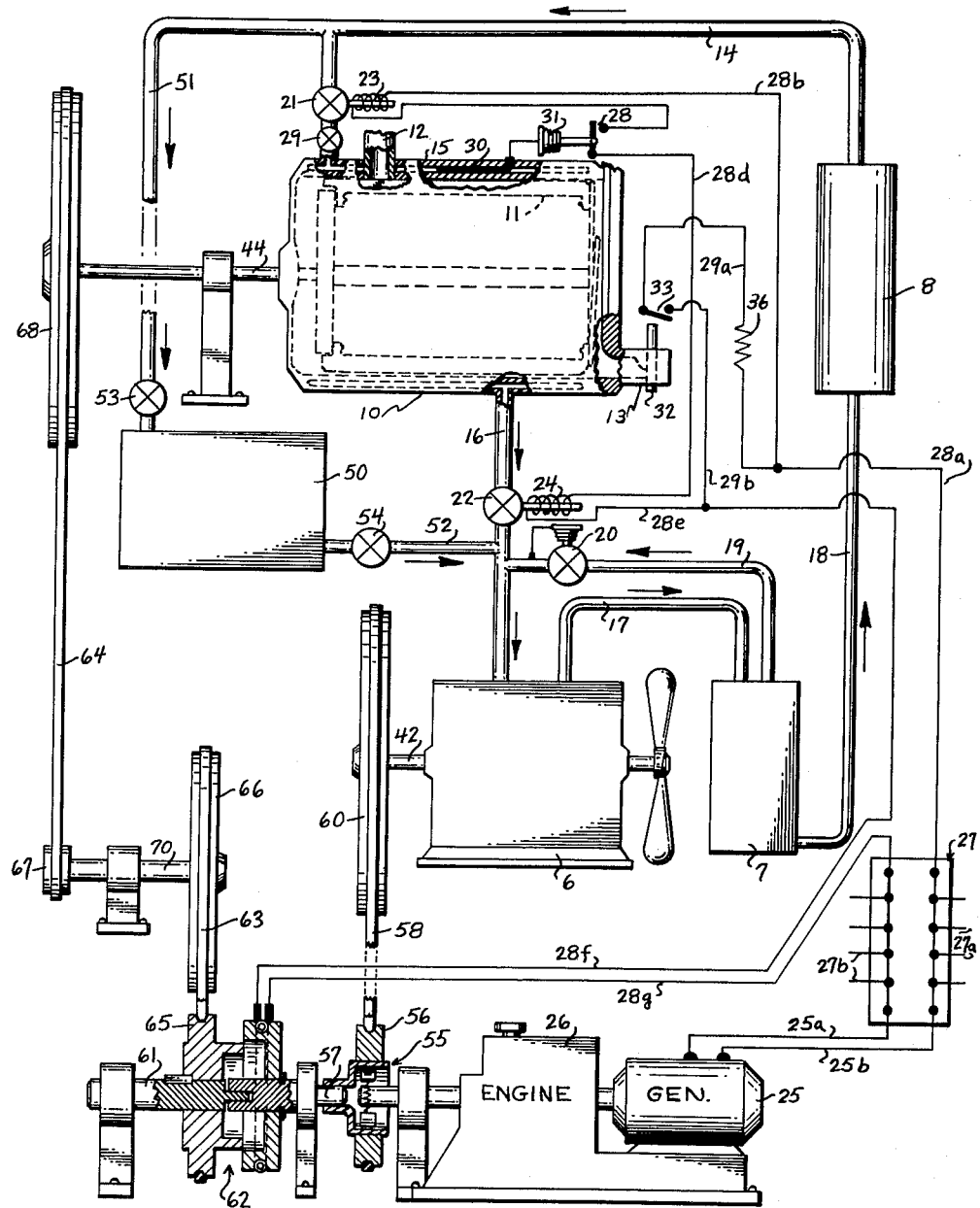

In the accompanying drawings:

FIGURE 1 is a diagrammatic illustration of a self-sufficient freezing and dasher drive arrangement for a dispensing freezer with an electric control and secondary electric power supply system embodying teachings of the present invention; and FIG. 2 is a diagrammatic illustration of a modified arrangement for also handling a secondary refrigeration load.

The system of the present invention provides a freezing circuit comprised of a dipsensing freezer 5, a compressor 6, and a condenser 7, and a liquid receiver 8. Within the freezing cylinder 10 of the freezer there is provided a dasher 11 having as its functions (1) to stir the mix which is charged through a feed pipe 12 and (2) to urge the frozen contents toward the discharge gate of a dispensing head 13. Liquid refrigerant is supplied by a pipe 14 from the receiver 8 to a jacket 15 of the freezer surrounding the freezing cylinder, and gas refrigerant returns by a pipe 16 from said jacket to the compressor 6. At the entry of the jacket 15 an expansion valve 29 is provided. Respective pipes 17 and 18 lead from the compressor to the condenser 7, and from the condenser to the liquid receiver. The refrigerant circuit is completed by a by-pass line 19 connecting the condenser with the compressor. Normally closing this by-pass line is a valve 20 opened automatically as the pressure at the suction side of the compressor lowers to a predetermined level. Also provided in the pipe 14 and the pipe 16, are normally closed valves 21 and 22, respectively, opened by the energizing of solenoids 23 and 24.

A motor-generator 25 driven by an internal combustion engine 26 supplies power by leads 25a-b to a terminal block 27. From the latter a normally open switch 28 runs to the solenoids 23–24 and to brushes 34a and field coil 34b of a normally disengaged electromagnetic clutch 34. The switch 28 is closed automatically as the temperature condition of the refrigerant within the jacket 15 rises above the upper of two low-temperature levels and it opens automatically as such temperature condition falls below the lower of said levels. For this purpose there is provided one or more thermostats 30 acting on a pressure-responsive diaphragm 31.

A second normally open electric circuit for the clutch 34 is provided with leads 28a, 28f and 28g by leads 29a-b which by-pass the solenoids 23–24 and switch 28. This by-pass contains a resistor 36 to match the combined resistance of the solenoids 23–24 and is controlled by a switch 33 which is closed automatically or by hand, in either case being performed in conjunction with the opening of a control plunger or gate 32 for the dispensing head. Refrigeration systems embodying structure like or similar to that of the above-described system are disclosed in the following United States Patents: 2,604,307, 2,687,-019, 2,698,163, 2,737,024, 2,746,260, 2,746,640 and 2,746,730.

Proceeding with a description of the first of the present advancements the field carrying member 34c of the clutch is fixed on the drive shaft 35 of the engine 26 while the complementing armature carrying member 34d of the clutch has a pulley 37 and is keyed on a stub shaft 38 which is necked to rotatively interfit with the drive shaft 35.

It will be noted that the pulley 37 drives a belt 40 which in turn gives a driving connection to a pulley 41 of increased diameter which is mounted on a drive shaft 42 for the compressor 6, thus giving a reduction drive from the engine to the compressor. Pulley 41 also drives the shaft extension 43, and reduction from the latter to a drive shaft 44 in the dasher 11, is effected by a belt 45 trained about pulleys 46–47.

The engine 26 is governed to run at a predetermined constant speed and is in continuous operation during operation of the freezer for driving the generator 25 as well as standing by to drive mechanical loads when the clutch 34 is engaged. Thus, electrical energy is made available at all times to the terminal block 27, not only for the field coil of the clutch, but for operating auxiliary electrical loads such as lights and electric motor driven fans, milkshake mixers, etc. which are usually present on the mobile unit in which the freezer is installed. The leads for these other loads are designated 27a–b.

From the foregoing it is seen that whenever the switch 33 is closed in conjunction with the act of opening the gate 32 to dispense frozen product from the freezing cylinder 10, the field coil of the magnetic clutch 34 is energized to automatically engage the clutch and thereby drive the dasher 11 so that frozen product will be urged thereby toward the dispensing head 13 for discharge past the open gate 32. Such engagement of the clutch 34 also of course starts the compressor 6. However, if the refrigeration needs of the freezing cylinder have not increased, which will commonly be the case if the freezer does not have an automatic mix feed system, the switch 28, and hence the valves 21–22, may remain closed during product dispensing without damaging the refrigeration system because the by-pass valve 20 will automatically open as the pressure at the suction side of the compressor lowers to the predetermined setting.

On the other hand, whenever the temperature condition of the refrigerant within the jacket 15 rises above the upper of its two low-temperature levels, the switch 28 automatically closes causing energizing of the solenoids 23–24 to open valves 20–21 regardless of whether the gate 32 is then open or closed. If the gate 33 is closed, the magnetic clutch will also be energized responsive to closing of the switch 28 and engage as before to drive the compressor 6. The dasher 11 will perforce also be driven, but this is desirable to maintain a uniform product consistency and to prevent a frozen product buildup on the inside wall of the freezing cylinder 10. When the freezer temperature has lowered to the lower presetting of the thermostat 30, the switch 28 automatically opens to open the control circuit and thereby close the valves 23–24 and disengage the clutch.

Commonly, the mobile unit will have refrigeration requirements other than the dispensing freezer, as for example a cold storage box for ice cream mix and food products, an air conditioner, or a soda fountain. Accordingly, in FIG. 2 I have shown a further modified system in which such a secondary refrigeration load is identified by numeral 50. The evaporator for this load is supplied with refrigerant through auxiliary line 51 from pipe 14 and discharges at 52 to the suction line 16 of the compressor. The conventional expansion and regulator valves 53–54, respectively, are also provided.

It will be noted that the drive from the engine 26 to the compressor 6 and to the dasher 11 is also modified. First, the drive shaft 35 of the engine is provided with a centrifugal clutch 55 which couples it with a pulley 56 and a jack shaft 57. The pulley 56 together with a belt 58 and pulley 60 provide a reduction drive to the drive shaft 42 of the compressor while the jack shaft 57 cooperates with a stub shaft 61 to carry an electro-magnetic clutch 62. This clutch is identical to the clutch 34 and is operated by the same control circuit as before described. Drive belts 63–64 trained about pulleys 65–66 and 67–68 compound their power in passing power from the clutch 62 first to an intermediate shaft 70 and then to the drive shaft 44 of the dasher 11. The engine has a constant speed setting and the contracting valves of the springs in the clutch 55 are such that the springs become overpowered by the centrifugal force exerted upon its drive shoes at an engine speed somewhat lower than such setting. By this arrangement the engine is enabled to start and build up speed under no-load conditions and then the clutch 55 automatically engages to thereafter continuously drive the compressor 6 and selectively drive dasher 11 via the clutch 62. The operating speed of the engine and capacity of the compressor 6 are such that the compressor has an output sufficient to satisfy the refrigeration requirements of the secondary load 50 as well as the dispensing freezer. If the valve 54 is closed responsive to satisfaction of the refrigerant requirement of the secondary load, and assuming that the valve 22 is also closed, the by-pass valve 20 will then automatically open responsive to the resulting lowering of the pressure at the suction side of the compressor. The refrigerant will then merely by-pass back to the compressor until the dispensing freezer or secondary load again has a refrigeration need. Operation of the electrical control circuit in the case of the FIG. 2 system is the same as that in FIG. 1 aforedescribed.

The clutches 34 and 62 have been illustrated as electromagnetic for purposes of example. It will be understood that other types of electrically actuated clutches can also be used such, for example, as a solenoid operated jaw clutch having its solenoid connected to the leads 28f–28g.

It is believed that the invention will have been clearly understood from the foregoing description of my now preferred illustrated embodiments. Changes in the details of construction may be resorted to without departing from the spirit of the invention, wherefore it is my intention that no limitations be implied and that the hereto annexed claims be given a scope fully commensurate with the broadest interpretation to which the employed language fairly admits.

What I claim, is:

1. In combination, a dispensing freezer having a rotary dasher, a normally closed discharge gate, and temperature response means, a second refrigeration load, a refrigeration system for said freezer and second load including a compressor, condenser means, and expansion means connected in refrigerant flow relationship, a by-pass line from said condenser means to the suction side of said compressor having a normally closed valve which opens automatically when the pressure at said suction side lowers to a predetermined level, electrically-operated control valve means for controlling the flow of refrigerant through said freezer, a substantially constant-speed internal combustion engine for driving said compressor, power transfer means from said engine to said dasher and including a normally disengaged electrically operated clutch, and control means including an electrical power supply and connected with said temperature response means for engaging said clutch and for opening said valve means when the temperature of said freezer exceeds a predetermined level.

2. In a unit for vending frozen or semi-frozen products, a freezer having a freezing chamber in association with which a refrigerant is circulated, a serving closure and a rotatable agitator cooperating with said chamber, a refrigeration apparatus for circulating said refrigerant including a refrigerant compressor and having electrically actuated valves normally preventing the circulation of refrigerant and being selectively operable to permit refrigerant circulation, driving means operatively connected to said compressor and selectively connected to the agitator through a normally disengaged electrically actuated clutch, and an electric control system including a power source operated by said driving means, and a circuit means connected to said power source, said clutch and said valves including a temperature responsive switch in heat exchange with the freezing chamber for automatically controlling the operation thereof in accordance with the temperature of said freezing chamber.

3. In a unit for vending frozen or semi-frozen products, a freezer having a freezing chamber in association with which a refrigerant is circulated, a serving closure and a rotatable agitator cooperating with said chamber, a refrigeration apparatus for circulating said refrigerant including a refrigerant compressor and having electrically actuated valves normally preventing the circulation of refrigerant and being selectively operable to permit refrigerant circulation, a substantially constant-speed internal combustion engine operatively connected to said compressor and selectively connected to the agitator through a normally disengaged electrically actuated clutch, and an electric control system including a power source operated by said engine and a circuit means connected to said power source, said clutch and said valves including a temperature responsive switch in heat exchange with the freezing chamber for automatically controlling the operation thereof in accordance with the temperature of said freezing chamber.

4. The unit of claim 1 in which said electrical power supply includes an electrical generator driven by said engine.

References Cited by the Examiner

UNITED STATES PATENTS

| | | | |
|---|---|---|---|
| 2,559,032 | 7/1951 | Tacchella | 62—342 |
| 2,779,163 | 1/1957 | Jacobs | 62—243 |
| 2,855,761 | 10/1958 | Jacobs | 62—243 |
| 2,889,691 | 6/1959 | Schjolin | 62—323 |
| 2,896,421 | 7/1959 | Rader | 62—135 |
| 2,952,140 | 9/1960 | Patty | 62—342 |
| 2,975,613 | 3/1961 | Heidorn | 62—243 |

ROBERT A. O'LEARY, *Primary Examiner.*

MEYER PERLIN, E. J. MICHAEL, P. L. PATRICK,
*Examiners.*

L. G. WISE, W. E. WAYNER, *Assistant Examiners.*